United States Patent [19]

Miyaoka et al.

[11] Patent Number: 5,058,186
[45] Date of Patent: Oct. 15, 1991

[54] METHOD AND APPARATUS FOR IMAGE COMPRESSION

[75] Inventors: Shinichiro Miyaoka, Kawasaki; Motohisa Funabashi, Sagamihara; Ryoichi Sasaki, Fujisawa, all of Japan

[73] Assignee: Hitachi, Ltd., Tokyo, Japan

[21] Appl. No.: 600,291

[22] Filed: Oct. 19, 1990

Related U.S. Application Data

[63] Continuation of Ser. No. 152,269, Feb. 4, 1988, abandoned.

[30] Foreign Application Priority Data

Feb. 18, 1987 [JP] Japan .................. 62-33253

[51] Int. Cl.⁵ .............................................. G66K 9/36
[52] U.S. Cl. ..................................... 382/56; 358/108; 382/8; 382/62
[58] Field of Search ................... 382/56, 1, 8, 42, 58, 382/62, 65; 258/135, 136, 87, 102, 105, 107, 108; 356/12, 390

[56] References Cited

U.S. PATENT DOCUMENTS

| | | | |
|---|---|---|---|
| 4,148,062 | 4/1979 | Kamin | 382/62 |
| 4,205,341 | 5/1980 | Mitsuya et al. | 358/135 |
| 4,236,180 | 11/1980 | Cayzae | 358/105 |
| 4,539,703 | 9/1985 | Clearman et al. | 382/28 |
| 4,562,468 | 12/1985 | Koga | 358/135 |
| 4,573,191 | 2/1986 | Kidode et al. | 382/42 |
| 4,613,898 | 9/1986 | Bagnall-Wild et al. | 358/87 |
| 4,723,298 | 2/1988 | Schiller | 382/56 |
| 4,724,480 | 2/1988 | Hechet et al. | 358/107 |
| 4,731,853 | 3/1988 | Hata et al. | 382/8 |
| 4,742,558 | 3/1988 | Ishibashi et al. | 382/56 |
| 4,759,072 | 7/1988 | Yamane et al. | 382/8 |
| 4,771,331 | 9/1988 | Bierling et al. | 358/135 |

*Primary Examiner*—David K. Moore
*Assistant Examiner*—Joseph Mancuso
*Attorney, Agent, or Firm*—Pennie & Edmonds

[57] ABSTRACT

In order to highly efficiently compress images of large quantity obtained by the photographing from a plurality of view points, provision is made of means for photographing a three-dimensional body or the like from a plurality of view points, means for forming a correlated image having a high correlation relative to the neighboring images by effecting mean processing for the neighboring images that are photographed, means for constructing, in the form of tree structure data, a set of the photographed images and the images formed by the mean processing, means for estimating the image of a lower rank by the one rank higher image in the tree structure data, and means for encoding an estimated error.

7 Claims, 7 Drawing Sheets

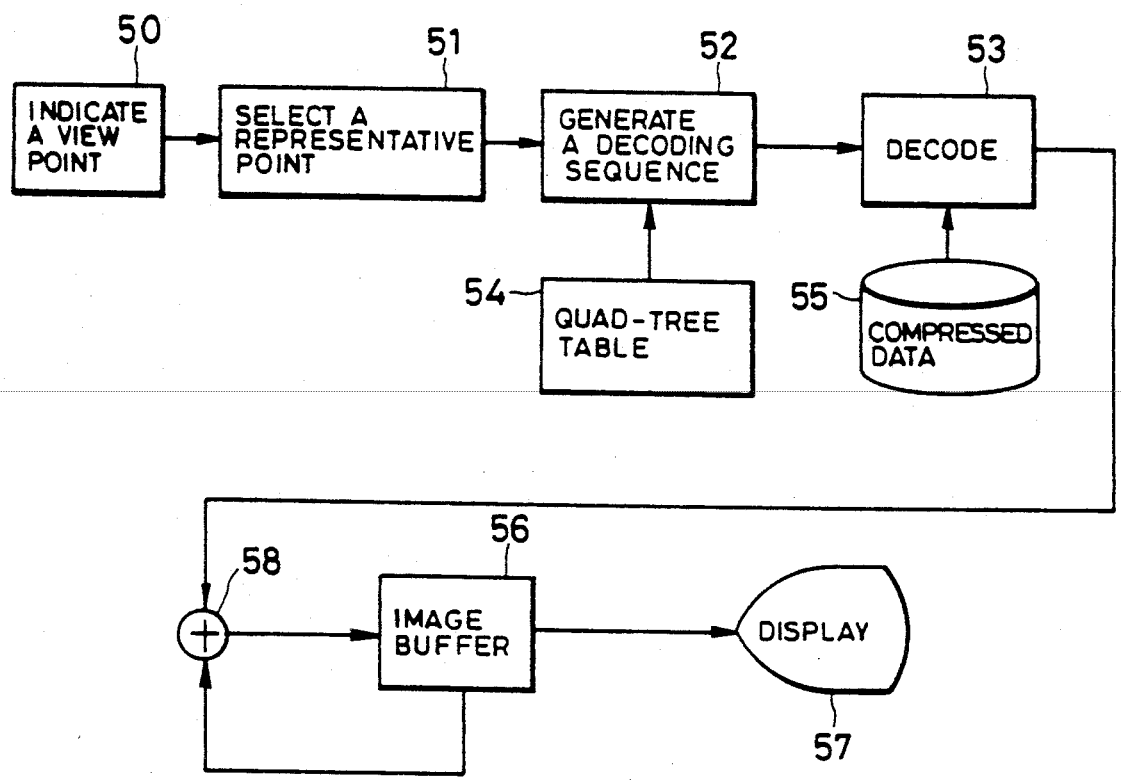

METHOD AND APPARATUS FOR IMAGE COMPRESSION

This is a continuation of application Ser. No. 07/152,269, filed Feb. 4, 1988 now abandoned.

BACKGROUND OF THE INVENTION

The present invention relates to a system for encoding image, and more specifically to a method and an apparatus for image compression suited for efficiently storing and retrieving image of large quantity obtained by photographing a three-dimensional body or a scene from many view points.

There has heretofore been proposed technology for compressing dynamic image to compress images of large quantity having high correlations. In the dynamic image, time series data of a large quantity are handled while supressing redundancy between the neighboring frames and redundancy in the frame (which may be a static image) to effect the encoding highly efficiently. An example has been disclosed in, for example, Japanese Patent Laid-Open No. 92985/1982.

According to the above prior technology in which the order of decoding complies with the time series, only the variation from a frame of a past moment is encoded to suppress redundancy between the frames. That is, the present frame is estimated from the frame of the past moment, and the estimated error is encoded. In the case of this invention, however, the order or decoding is not definite though the image resembles and the redundancy becomes high as viewed from the neighboring points. It is therefore difficult to fix the image that corresponds to "a frame of a past moment" in the dynamic image, and the system of dynamic image compression cannot be adapted thereto.

SUMMARY OF THE INVENTION

The object of the present invention is to provide a highly efficient method and an apparatus for image compression which, when a view point is given, are capable of immediately decoding scenery image obtained from the view points in a system which stores and retrieves image of large quantity photographed from many view points.

In order to achieve the above object, the feature of the present invention resides in the provision of means for effecting the mean processing between images of neighboring view points, means for constructing, in the form of tree structure data, the sets of the photographed images and the images formed by the mean processing, means for estimating the image of a lower rank based upon the one rank higher image of the tree structure data.

On the tree structure data, the photographed image is corresponded to the node of the lowest level, and a mean image thereof is positioned at a one rank higher level. An image obtained by further averaging the neighboring mean images, is positioned at a higher level determined by the number of averaging. In such a structure, the one rank higher image well estimates the image of the lower rank since similarity is high between the neighboring images, and the energy in the estimated error has a small value. The estimated error image is encoded by an ordinary static image compression system and is corresponded to a related node in the tree structure data. The decoding is carried out easily by generating a sequence of estimated image to be decoded relying upon the designated view points and the tree structure data.

BRIEF DESCRIPTION OF THE DRAWINGS

FIG. 5 is a diagram showing a decoding unit;

DETAILED DESCRIPTION OF THE PREFERRED EMBODIMENT

An embodiment of the present invention will now be described in conjunction with FIGS. 1 to 7.

Figure 1:
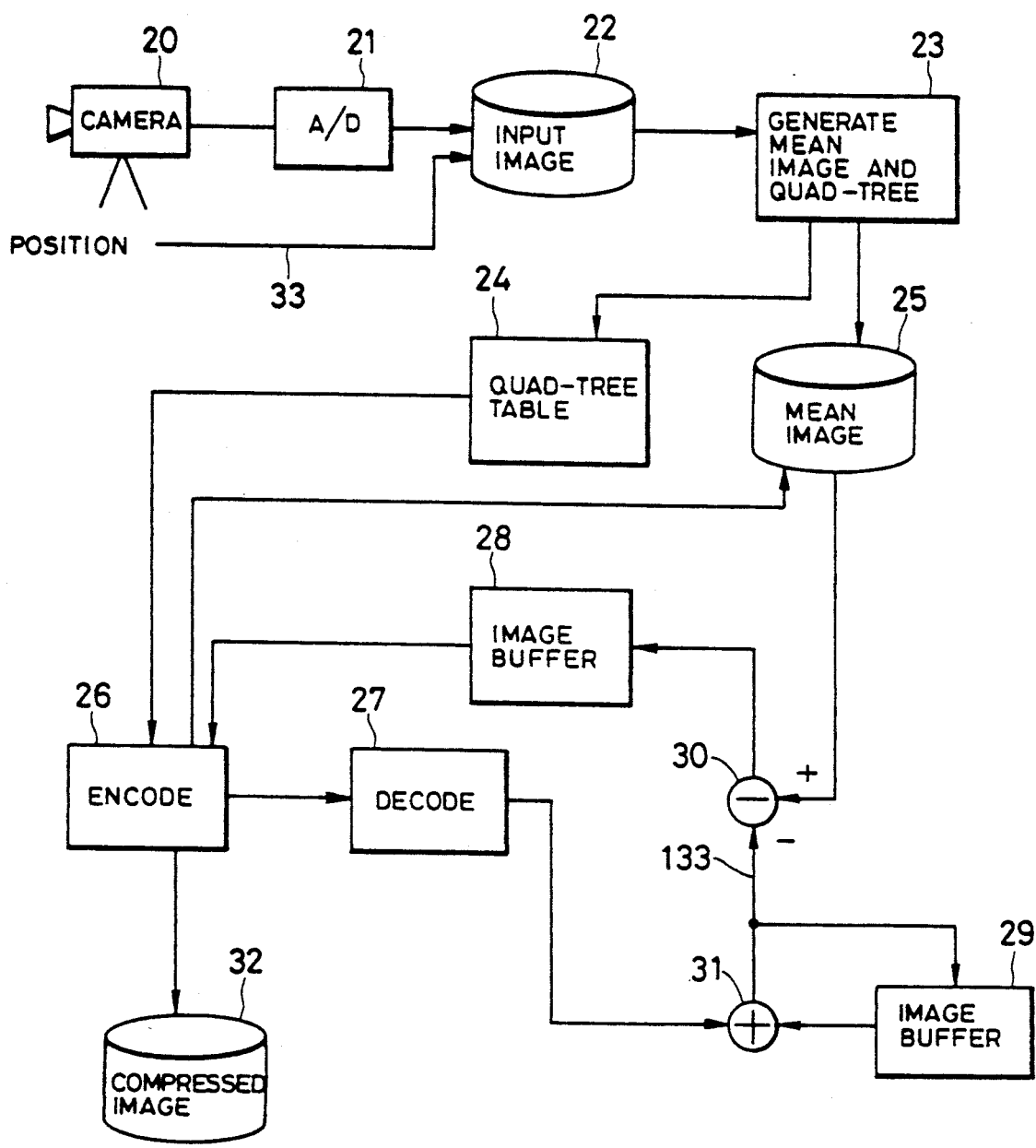
FIG. 1 is a diagram illustrating the structure of a compressing apparatus according to an embodiment of the present invention.
Figure 6:
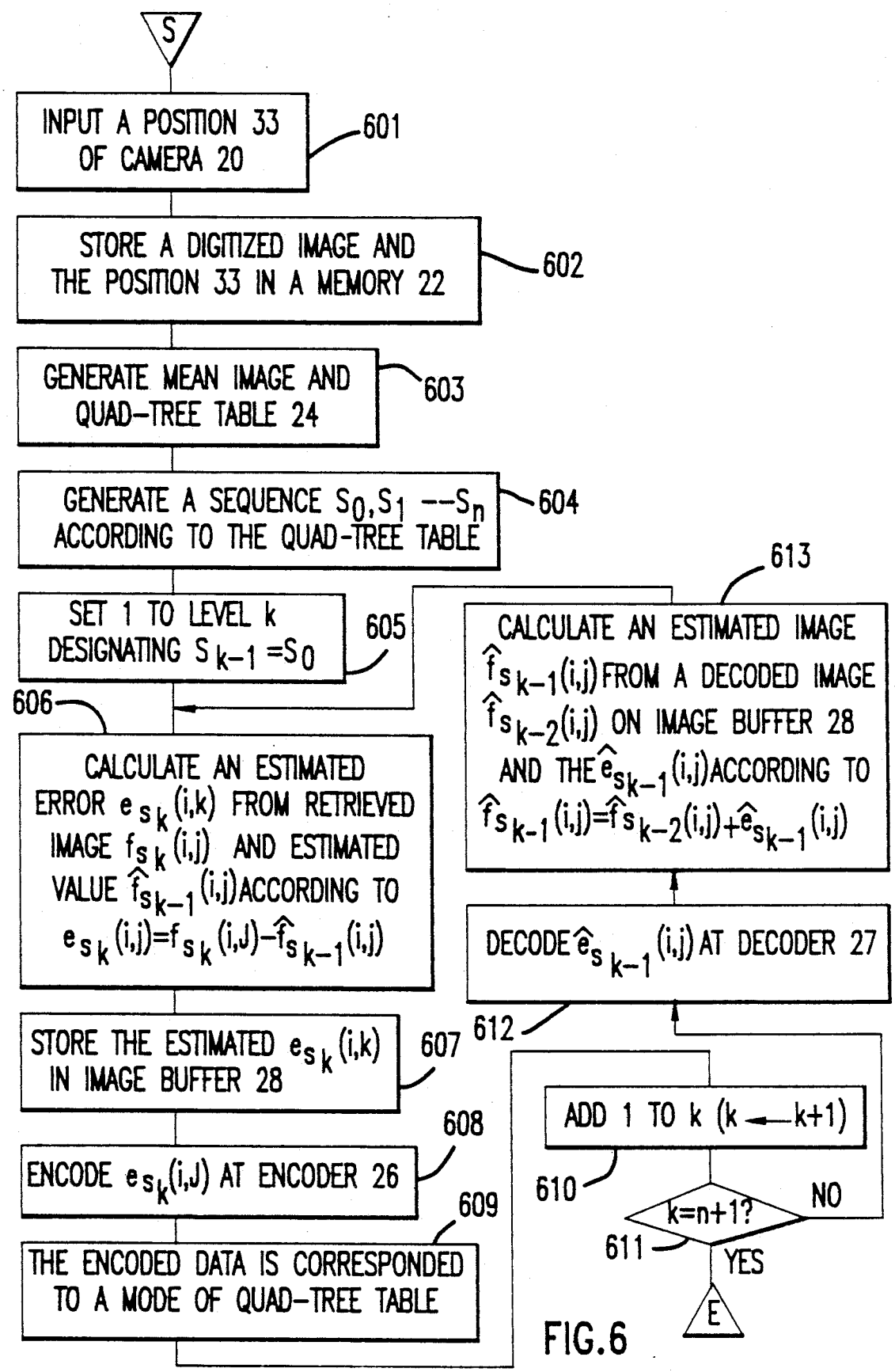
FIG. 6 is a flowchart showing the basic operations for controlling the apparatus in FIG. 1.

FIG. 1 shows an image compressing apparatus according to an embodiment, which is controlled by a conventional computer equipped with a program. FIG. 6 is a flowchart indicating a control sequence according to the program. Parameters (for example, n mentioned hereinafter) in the program are preset before execution in a conventional and well-known manner.

In block 601 of FIG. 6, the operator inputs the position 33 view point in FIG. 1, through conventional input means. For example, the view point indicating unit 50 in FIG. 5 may be used for the input means. In block 602, an image obtained from a camera 20 is digitized by an A/D converter 21 and is stored in a memory 22 together with a position 33 from a view point indicating (camera) unit. In block 603, a processing unit 23 generates a mean image and a quad-tree table on the basis of the input image and the position of view point. The mean image and the quad-tree table are stored in memories 25 and 24. In block 604–608, as shown in FIG. 6, encoding unit 26 stores in an image buffer 28 the difference between an estimated signal 133 and the mean image or the photographed image retrieved according to the table, and then encodes the difference. The encoded data is stored in a memory 32, decoded through a decoder 27, and is added to the image data of an image buffer 29 to obtain the estimate signal 133.

Figure 2A:
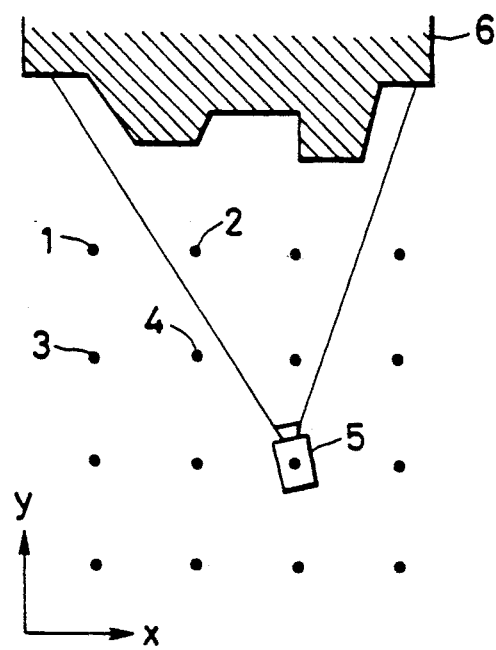
FIGS. 2a–b are diagrams which schematically illustrates an image photographed from many view points.
Figure 2B:
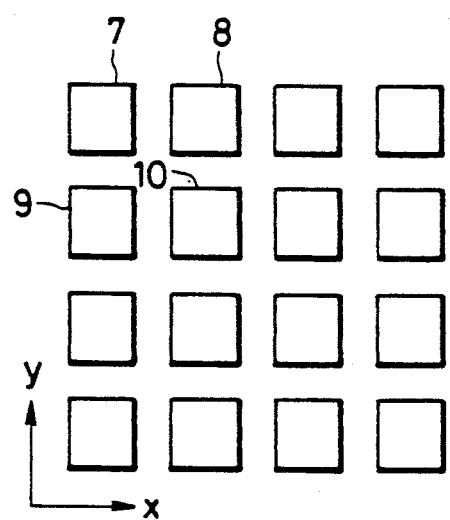
Figure 3:
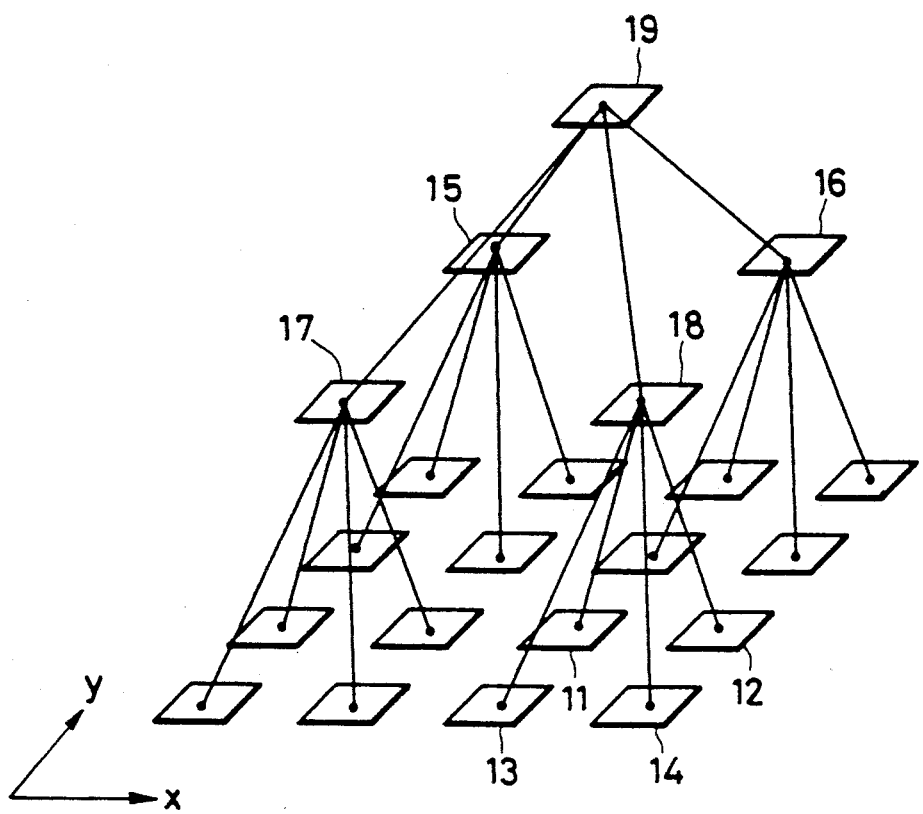
FIG. 3 is a diagram which schematically illustrates a quad-tree structure.
Figure 4A:
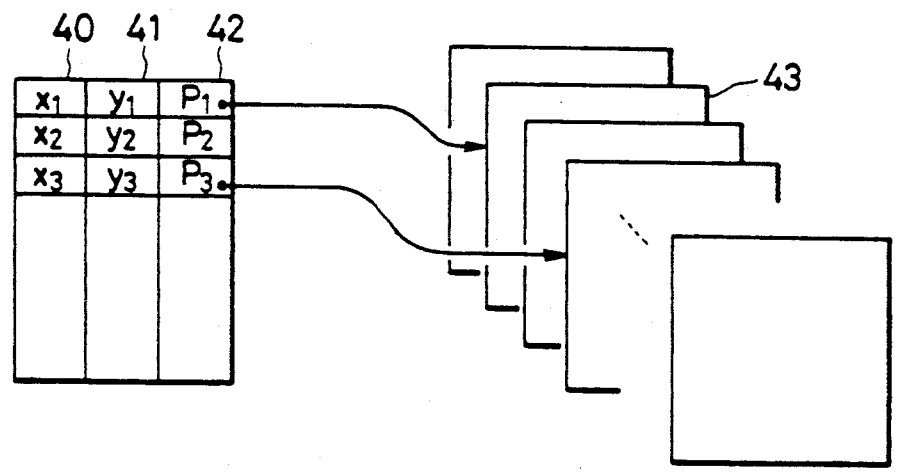
FIGS. 4a–b are diagrams showing the structure of a table in the memory of FIG. 1.
Figure 4B:
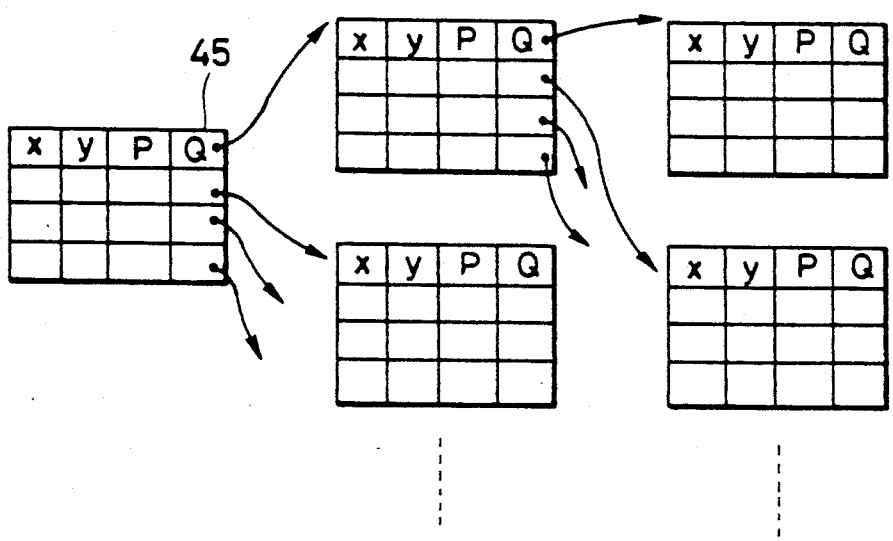

Operation of the embodiment of FIG. 1 will now be described. Referring to FIG. 2(a), a scene 6 such as of a three-dimensional body or the like is photographed by a camera 5 from $2^n \times 2^n$ (n denotes number of levels in the quad-tree) view points 1, 2, 3, 4,-arranged in the form of a lattice. Referring to FIG. 2(b), photographed images 7, 8, 9, 10,-are obtained corresponding to view points 1, 2, 3, 4,-of FIG. 2(a). The photographed images and positions of view points are stored in the memory 22 in a form as shown, for example, in FIG. 4(a) wherein columns 40, 41 and 42 denote x-coordinates of view points, y-coordinates of view points and pointers that indicate addresses of the photographed images. In the example of FIG. 4(a), a pointer $P_1$ of column 42 makes the coordinate $(x_1, y_1)$ to correspond to an image 43. The processing unit 23 subjects four neighboring images to the mean processing in order to generate a quad-tree of n levels, as shown in FIG. 3. Mean processing is carried out in accordance with the following equation, $$\bar{f}_{ij} = \frac{1}{4} \sum_{k'=1}^{4} f_{ij}k'$$

where $\bar{f}_{ij}$ denotes brightness of picture element (i, j) of the mean image, and $f_{ij}k'$ denotes brightness of picture element (i, j) of the photographed image.

In the example of FIG. 3, a mean image 18 is obtained from the photographed images 11, 12, 13 and 14, and a mean image 19 is further obtained from the mean images 15, 16, 17 and 18. The quad-tree structure is stored in the memory 24 in a form as shown, for example, in FIG. 4(b), wherein symbols x, y and p have the same meanings as those of FIG. 4(a), and Q of column 45 denotes pointers that indicate four subnodes. The images corresponding to the nodes are stored in the memory 25 designated by the pointer P. Block 604, in accordance with the quad-tree table 24, and the encoder 26 generates a sequence of nodes denoted by $S_0$, $S_1$-$S_n$, on a quad-tree from a root node $S_0$ corresponding to level $k=1$ (node 19 in FIG. 3) to a node $S_n$ corresponding to level $k=n+1$ of an image to be encoded. In accordance with this sequence, the corresponding images are successively retrieved from the memory 25 and are subjected to the following processings.

First, in block 605, 1 is set for level k to designate $S_0$. In block 606, a difference is calculated between a retrieved image $f(i,j) = f_{SK}(i,j)$ and an estimate value 133 ($\hat{f}(i,j) = \hat{f}_{SK-1}(i,j)$) thereof, and in block 607 an estimated error $e(i,j) = e_{SK}(i,j)$ is stored in the image buffer 28. The estimated error $e(i,j)$ is calculated according to, for example, the following relation, $$e(i,j) = f(i,j) - \bar{f}(i,j);$$

and more concretely $e_{SK}(i,j) = \hat{f}_{SK}(i,j) - f_{SK-1}(i,j)$ where $e(i,j)$ denotes a value of picture element (i,j) of an estimated error image and $\bar{f}(i,j)$ denotes an estimated value of $f(i,j)$.

In block 608, the estimated error image on the image buffer is encoded by the encoder 26 in accordance with the well known and conventional method taught, for example, in U.S. Pat. No. 4,225,885. The encoded data corresponds to a node of the quad-tree only when it is the image that is to be encoded (see block 609), and is stored in the memory 32. "1" is added to k (block 610) and new k is compared with (n+1) (block 611). Here, the images corresponding to the node sequence ($S_0$, $S_1$-$S_{n-1}$), except the image of $S_n$ for level $k=n+1$ to be encoded have all been encoded already and are used only for generating the estimated values 133. The estimated values 133 are generated in a manner described below. The estimated value $f_{SK-1}(i,j)$ of image of the level $k-1$ (root node has the level 1 and the level number is attached so as to increase toward the lower direction) included in the node sequence is obtained in block 613 by adding up together a decoded image $f_{SK-2}(i,j)$ of a level $k-2$ on the image buffer 29 and an estimated error image $e_{SK-1}(i,j)$ of a level $k-1$ decoded by the decoder 27 in block 612. The estimated result 31 just represents the decoded image of the level $k-1$, and is stored in the image buffer 29 and is used for forming an estimated value of image of the level $k+1$.

Figure 7:
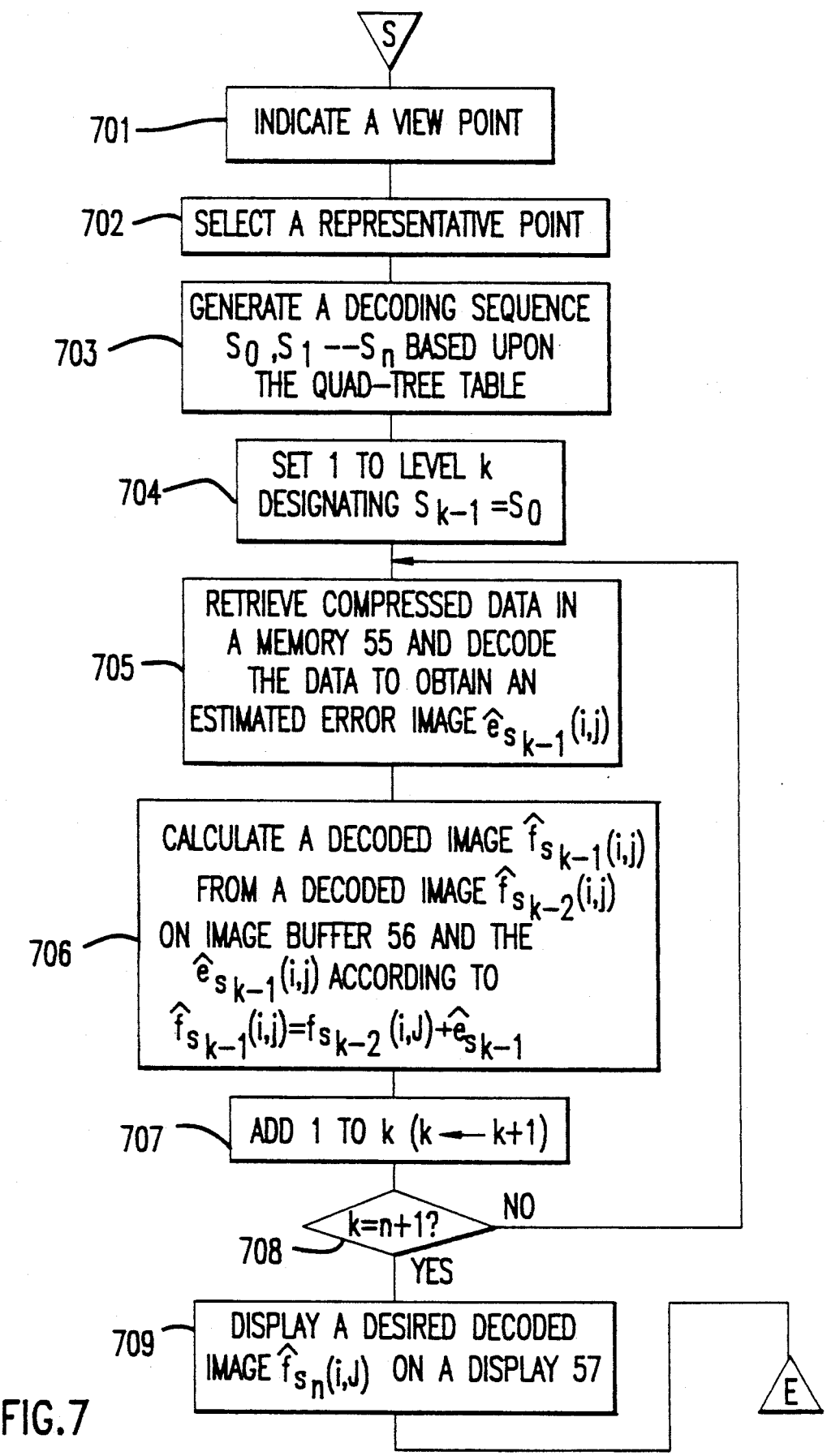
FIG. 7 is a flowchart showing the basic operations for controlling the apparatus in FIG. 5.

FIG. 5 illustrates a decoding unit according to the embodiment of the invention, which is controlled by a conventional and well-known computer equipped with a program. FIG. 7 is a flowchart indicating a control sequence according to the program. In block 701 of FIG. 7, a coordinate of a view point is obtained from a view point indicating unit 50, and in block 702 a representative point (view point set during the compression process) closest to the view point is selected by a processing unit 51. Based upon the quad-tree table, in block 703, a processing unit 52 generates a sequence of nodes denoted by $S_0$, $S_1$-$S_n$ from the root node $S_0$ corresponding to level $k=1$ to a node that corresponds to the representative node $S_n$ corresponding to the level $k=n+1$. This is a decoding sequence. Firstly, in block 704, 1 is set for level k to designate $S_0$. In block 705, a decoder 53 retrieves the compressed data in the memory 55 and decodes it in compliance with the decoding sequence. The image decoded here represents an estimated error image $e_{SK-1}(i,j)$ which is then added to a one rank higher decoded image $f_{SK-2}(i,j)$ on the image buffer 56 to form a completely decoded image $f_{SK-1}(i,j)$ in block 706. "1" is added to k (block 707) and new k is compared with (n+1) (block 708). When a final node $S_n$ of the node sequence is reached, a desired decoded image corresponding to the representative point is obtained and is displayed on a display 57 in block 709.

According to this system which uses a decoded image which is higher by one rank as an estimated image, the encoded distortion of estimated error image of a given level remains at that level; i.e., the encoded distortion does not propagate from a higher level in the quad-tree to the lower levels.

According to the present invention, images of large quantity obtained by photographing a three-dimensional body or a scene from many view points are encoded highly efficiently by utilizing correlations among images of neighboring view points and are decoded in any sequence. Therefore, the data to be stored can be reduced and scenery image from a given view point can be retrieved and displayed at high speeds.

What is claimed is:

1. A method of compressing an amount of data required to represent a plurality of viewpoint image projections of a three-dimensional body or scene comprising the steps of:

producing a plurality of images of a three-dimensional body or a scene, each from a corresponding one of a plurality of viewpoints;

generating a mean image by averaging a set of said images produced from a respective set of spatially neighboring viewpoints; and generating a plurality of difference images, each of said difference images being in unique correspondence to the difference between an image from one of said spatially neighboring viewpoints and said mean image, whereby data from the group consisting of said difference images and said mean image constitutes a compressed representation of, and basis for, reconstructing at least on of said spatially neighboring viewpoints.

2. The method as defined in claim 1, further comprising the steps of:

generating a plurality of mean images from the neighboring view points;

generating a hierarchical mean image by averaging the neighboring mean images; and encoding the difference between said hierarchical mean image and each of said neighboring mean images.

3. The method as defined in claim 2, wherein said neighboring mean images are constructed in the form of a tree structure data.

4. An apparatus for compressing an amount of data required to represent a plurality of viewpoint image projections of a three-dimensional body or scene comprising:

means for producing a plurality of images of a three-dimensional body or a scene, each from a corresponding one of a plurality of viewpoints;

means for forming a mean image by averaging a set of said images produced from a plurality of spatially neighboring viewpoints; and means for generating a plurality of difference images, each being in unique correspondence to the difference between an image from one said spatially neighboring viewpoint and said mean image, whereby data from the group consisting of said difference images and said mean image constitutes a compressed representation of, and basis for, reconstructing at least one of said spatially neighboring viewpoints.

5. The apparatus as defined on claim 4, further comprising:

means for generating a plurality of mean images from the neighboring view points;

means for generating a hierarchical mean image by averaging the neighboring mean images; and means for encoding the differences between said hierarchical mean image and each of said neighboring mean images.

6. A method of image compression comprising the steps of:

producing a plurality of images of a three-dimensional body or a scene, each from a corresponding one of a plurality of viewpoints;

generating a mean image by averaging a set of said images produced from a respective set of spatially neighboring viewpoints;

generating a plurality of difference images, each of said difference images being in unique correspondence to the difference between an image from one of said spatially neighboring viewpoints and said mean image; and reconstructing at least one of said images from one of said spatially neighboring viewpoints according to a corresponding set of said difference images and said mean image.

7. An apparatus for image compression comprising:

means for producing a plurality of images of a three-dimensional body or a scene, each from a corresponding one of a plurality of corresponding viewpoints;

means for forming a mean image by averaging a set of said images produced from a plurality of spatially neighboring viewpoints;

means for generating a plurality of difference images, each being in unique correspondence to the difference between an image from one said spatially neighboring viewpoint and said mean image; and means for reconstructing at least one of said images from one of said spatially neighboring viewpoints according to a corresponding set of said difference images and said mean image.

* * * * *